April 17, 1962 T. G. THOMAS 3,029,909
WHEEL COVER
Filed Oct. 12, 1959 3 Sheets-Sheet 1

INVENTOR.
Thomas G. Thomas
BY
His Attorney

April 17, 1962  T. G. THOMAS  3,029,909
WHEEL COVER

Filed Oct. 12, 1959  3 Sheets-Sheet 2

INVENTOR.
Thomas G. Thomas
BY
His Attorney

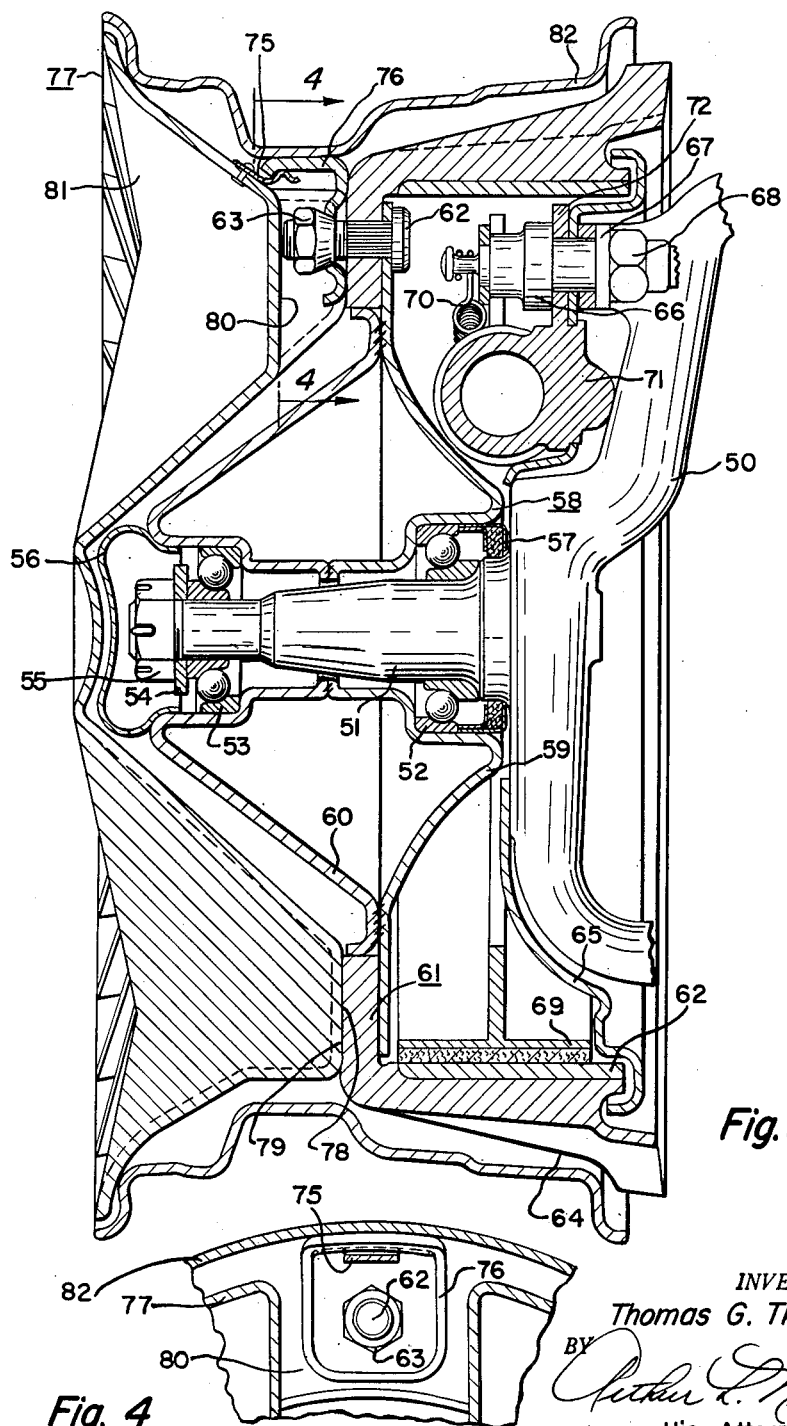

United States Patent Office 3,029,909
Patented Apr. 17, 1962

3,029,909
WHEEL COVER
Thomas G. Thomas, Bedford, Ind., assignor to General Motors Corporation, Detroit, Mich., a corporation of Delaware
Filed Oct. 12, 1959, Ser. No. 845,751
3 Claims. (Cl. 188—264)

This invention relates to a vehicle drum brake and more particularly to a wheel cover for cooling a vehicle drum brake.

The ability of any braking means largely depends for its satisfactory performance on its ability to maintain a cool operating condition. For this reason, it is desirable to provide a cooling means for the braking structure. The cooling means may provide some manner in transferring the heat within the brake drum to some external point where the heat may be radiated to the passing air stream. Accordingly, this invention is intended to provide a cooling wheel cover in combination with a vehicle drum brake. This invention provides for a wheel cover extending through the vehicle wheel to contact a portion of the vehicle brake drum and provide a path to transfer the heat from the brake drum to an external point where the heat may be radiated to the air stream.

It is an object of this invention to provide an air cooling means for cooling of a vehicle drum brake.

It is another object of this invention to provide a path for conduction of heat from the vehicle brake drum through the vehicle wheel to an external point for radiation of the heat to the passing air stream as the vehicle is in motion.

It is a further object of this invention to provide a wheel cover which extends through opening means in the vehicle wheel contacting the brake drum for transfer of heat externally from the braking means for radiation to the atmosphere. It is also intended the wheel be provided with opening means for access to the wheel cover fastening means and which also permits movement of air through the wheel.

The objects of this invention are accomplished by means of employing a vehicle drum brake having fins about its outer periphery to dissipate heat from the brake drum. The heat on this side of the wheel is radiated directly to the atmosphere. A wheel cover is mounted on the outboard side of the brake drum maintaining a firm contact with the radial wall of the brake drum to provide a path for heat transferred to the outboard side of the vehicle wheel. The wheel cover is provided with a plurality of angularly spaced fins for radiation of the heat dissipated within the brake drum to the passing air stream along the outboard side of the vehicle wheel as the wheel is in rotation. The wheel cover is provided with a central opening for the reception of a hub cap which is readily removable. The removable hub cap provides convenient means by which the fastening means of the vehicle wheel is readily accessible from the outboard side of the vehicle wheel. The wheel cover may also be removed through access of the central opening in the wheel cover once the hub cap is removed.

Further objects and advantages of the present invention will be apparent from the following description, reference being had to the accompanying drawings wherein preferred embodiments of the present invention are clearly shown.

In the drawings:

FIGURE 3 is a cross-section view of the modified wheel cover and vehicle wheel.

FIGURE 4 is a cross-section view taken on line 4—4 of FIGURE 3.

The illustrations in this application show a vehicle drum brake having fins about the outer periphery of the brake drum. These fins provide radiation of heat to the air as the brake drum is rotated with the vehicle wheel. A second means for radiation of the dissipated heat within the brake drum is provided by the heat transfer legs formed integral with the wheel cover. The heat transfer legs abut the side of the brake drum and transfer heat from the brake drum to the outboard side of the vehicle wheel. The heat transfer legs extend through the vehicle wheel. The openings in the vehicle wheel to accommodate the heat transfer legs are of slightly larger size than the heat transfer legs to permit air movement through the vehicle wheels. The air movement assists in cooling of the brake drum.

Figure 1:
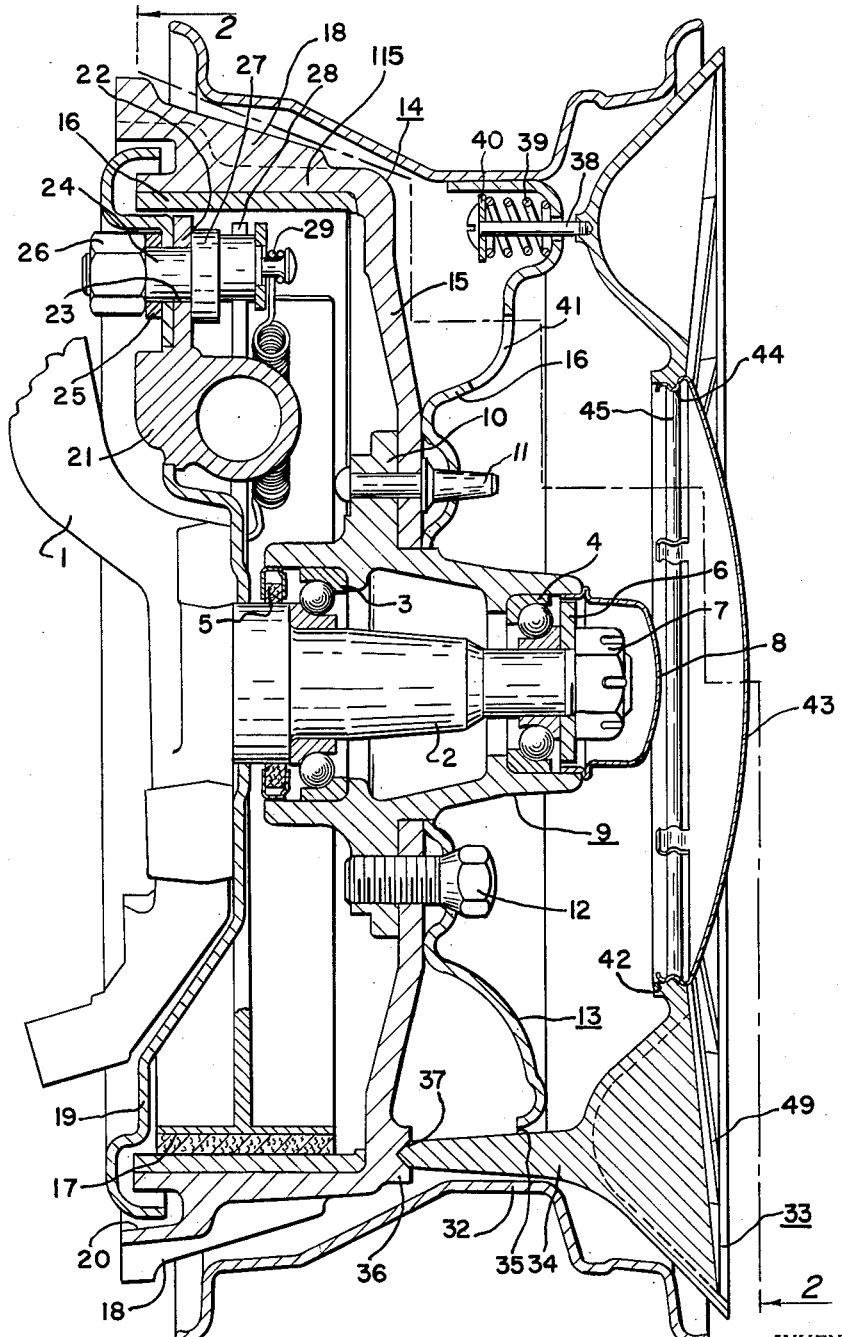
FIGURE 1 is a cross-section view of the vehicle drum brake, the wheel, and the wheel cover.

FIGURE 1, being a cross-section view of the brake drum and the wheel cover, illustrates the relative position of the various parts of the brake structure and the wheel and wheel cover. FIGURE 1 is an illustration of the front wheel of a vehicle with the steering knuckle 1 having a spindle 2 for supporting the vehicle wheel. The spindle 2 extends axially outboard to receive the bearing assemblies 3 and 4. The inboard bearing assembly 3 is provided with a grease seal 5 mounted on the outer periphery of the spindle on the inboard side of the bearing assembly 3. The outboard bearing assembly 4 is mounted on the spindle and is retained in its position by the washer 6 which is fastened by a nut 7. The bearing assembly is enclosed by the cover 8 which fits in the outboard end of the hub 9. The wheel hub 9 rotatably mounts on the bearing assemblies 3 and 4. The hub 9 has a radial flange 10 to provide a means for supporting the wheel by pivot pin 11 and the plurality of bolts 12. The brake drum 14 has a wall supporting portion 15 which is fastened between the radial support wall 16 of the vehicle wheel 13 and the radial flange 10 of the hub 9. The brake drum 14 has a drum portion 115 with a sleeve insert 16 for engagement of the brake shoe 17. The outer periphery of the brake drum 14 is provided with a plurality of fins 18. The fins 18 extend for the greater length of the drum portion 115 of the brake drum 14.

The backing plate 19 is mounted on the steering knuckle 1 and its outer periphery fits within a sealing groove 20 on the outer periphery of the brake drum 14. The backing plate 19 provides a support means for the braking structure within the brake drum 19. The wheel cylinder 21 is mounted on the backing plate 19. A tangential extending flange 22 on the wheel cylinder 21 has a perforation 23 for reception of the anchor pin 24. The anchor pin 24 is fastened to a flange 25 on the steering knuckle 1. The anchor pin 24 is fastened by the means of the nut 26 which threadedly engages the anchor pin on the inboard side of the backing plate 19.

The anchor pin 24 extends through the backing plate having a shoulder 27 for engaging the tangential flanged tube 22 of the hydraulic cylinder 21. A portion of the anchor pin is employed for engaging the brake shoe 28 in its retracted position. The brake shoe 28 is biased to a contacting position on the anchor pin 24 by means of the retraction spring 29.

The vehicle wheel 13 comprises a rim 32 fastened to the supporting wall 16. The supporting wall 16 is fastened to the hub 9 by means of a plurality of lug bolts 12. The supporting wall 16 of wheel 13 provides the means for supporting the wheel cover 33. The wheel cover 33 is concentrically mounted on the wheel 13. The wheel cover includes the heat transfer legs 34 which extend through the perforations 35 of the rim supporting section 16 of wheel 13. The brake drum 14 is provided with a plurality of arcuate bosses 36 having depressions 37 for the reception of the end of the heat transfer legs 34. The contact point of the heat transfer leg 34 is of the same contour as the depression 37 in the arcuate bosses 36 of the brake drum. The surface of the contact point of the heat transfer leg and the depression 37 is also smooth to insure heat transfer from the brake drum to the heat transfer leg 34.

The wheel cover 33 is fastened to the rim supporting section 16 of the vehicle wheel 13 by means of a plurality of screws 38. The screws 38 are mounted within the spring 39 which is compressed between the washer 40 and the wheel 13. The screws 38 may be inserted through a plurality of openings 41, each opening being radially inward from the screw in the wheel 13. The screws 38 may be fastened when the wheel is removed.

The compression spring 39 maintains a constant contact between the heat transfer arm 34 and the brake drum 14. The openings 41 and 35 also provide a means for movement of air through the wheel from the inboard side to the outboard side of the vehicle wheel.

The wheel cover 33 is provided with a central opening 42 for the reception of the hub cap 43. The hub cap 43 is provided with a resilient portion 44 for reception on the annular bead 45 of the opening 42. The hub cap 43 is readily removable from the wheel cover 33 to provide access to the central portion of the wheel.

The wheel cover consists of an externally finned torus which is fastened on its inboard side by the plurality of screws 38. The inner periphery of the torus receives the hub cap 43. The outboard side of the torus is formed with a plurality of fins 49 angularly spaced along the side. These fins provide a means for radiating the heat which is transferred from the brake drum through the heat to transfer arms 34 to the fins 49. The fins operate along the air stream to transfer the heat from the wheel cover to the passing air stream and in this manner provide a cooling means for the braking structure.

Figure 2:
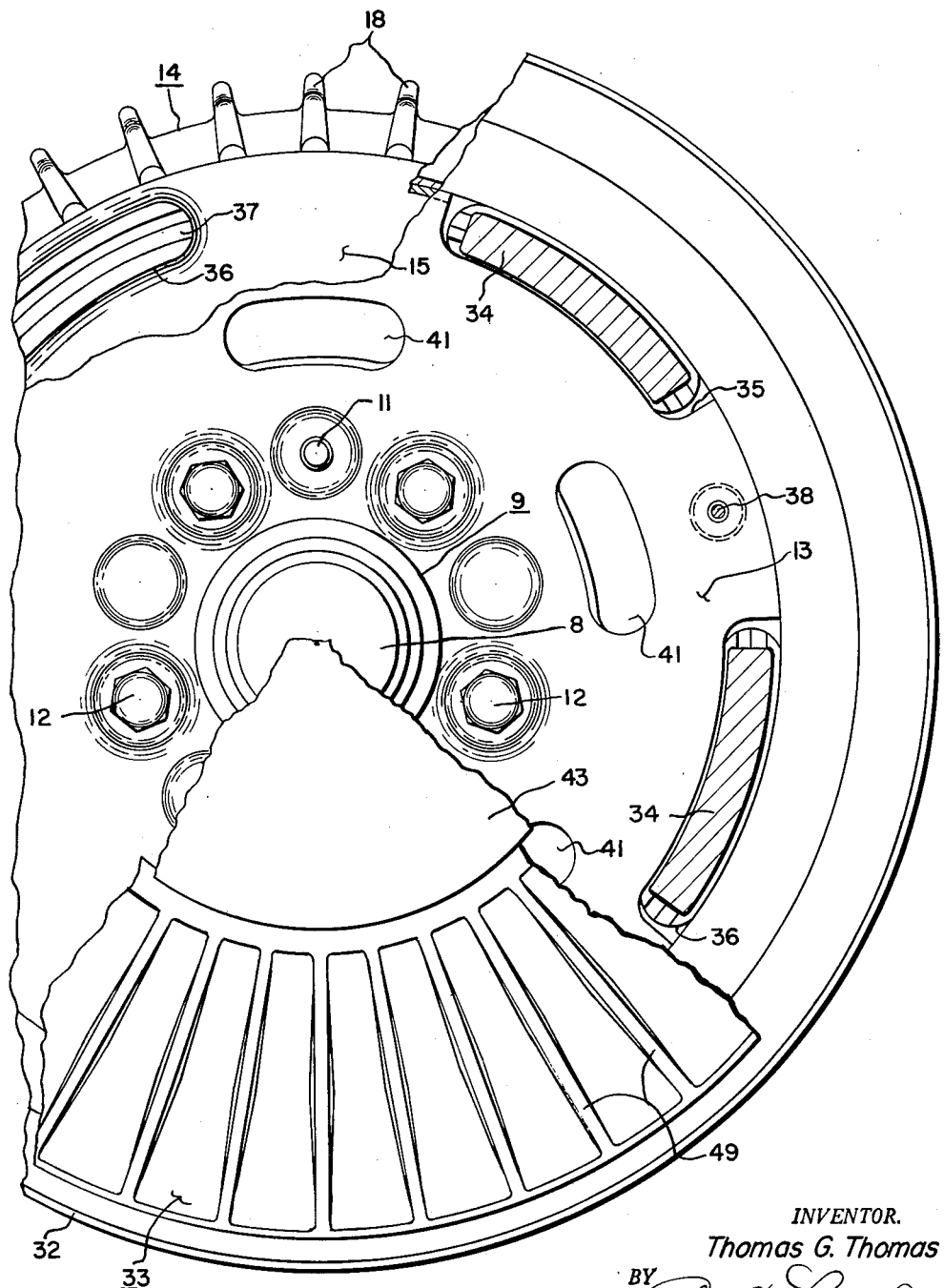
FIGURE 2 is a side elevation view taken from the outboard side of the vehicle wheel with sections broken away to more clearly illustrate the relative positions of the various parts of the wheel and drum brake.

FIGURE 2 is a side elevation view of the wheel cover and wheel as illustrated in FIGURE 1. The upper portion of the wheel cover is broken away to show the seating depression 37 on the brake drum for the heat transfer legs 34. The right-hand upper portion of the FIGURE 2 shows the heat transfer legs in cross section extending through the opening 35. The lower portion of FIGURE 2 is the side elevation of the wheel cover showing the hub cap 43 in its position within the wheel cover 33. The wheel cover 33 has its radially outer portion in spaced relation to the rim 32 to provide a limited air passage means between the wheel cover and the rim. This view illustrates that the heat may be transferred from the brake drum through conduction through the heat transfer arms to the outboard side of the vehicle wheel 13. It also illustrates that there is opening means within the wheel structure to permit a movement of air through the vehicle wheel. This movement of air also provides a means for transferring the heat from the brake drum to the outboard side of the vehicle wheel where it is discharged to the passing air stream along the vehicle wheel.

FIGURE 3 is a modified version wherein a wheel cover abuts the outboard side of the brake drum. In this manner, the heat transfer legs are eliminated and the wheel cover transfers the heat from the brake drum directly to the radiating fins on the outboard side of the wheel cover. This version provides means for greater heat transfer from the brake drum to the radiating fins on the wheel cover. The fins on the wheel cover are also of a larger size to radiate the greater heat transferred from the brake drum to the wheel cover.

The steering knuckle 50 is formed integral with the spindle 51 which extends outboard to receive the bearing assemblies 52 and 53. The bearing assembly 53 is held in its position by the washer 54 and the nut 55 which threadedly engages the outboard end of the spindle 51. The nut 55 is enclosed by the cover 56. The inboard bearing assembly 52 is provided with a grease seal 57 which is mounted within the wheel 58. The wheel 58 is of welded construction including the inboard section 59 and the outboard section 60 which are welded to provide a sturdy wheel construction. The inner periphery of the wheel receives the bearing assemblies 52 and 53. The radially outer portion of the wheel 58 is fastened to the brake drum 61 by means of a plurality of bolts 62 and nut 63.

The brake drum 61 receives a liner 62 for engagement with the brake shoe 69. The outer periphery of the brake drum 61 is formed with a plurality of radiating fins 64.

The backing plate 65 mounts on the steering knuckle 50. The backing plate 65 provides a mounting means for the anchor pin 66 which is fastened to a flange 67 of the steering knuckle 50. The nut 68 threadedly engages the inboard end of the anchor pin 66. The brake shoe 69 rests against the anchor pin 66 in its retracted position due to the biasing force of the retraction spring 70. The wheel cylinder 71 is also mounted on the backing plate 65 and fastened by its radial flange 72 receiving the anchor pin 66.

The wheel cover in FIGURE 3 is a full cover for the wheel extending to the rim portion of the vehicle wheel. The wheel cover does not have a hub cap as previously illustrated in FIGURE 1. The wheel cover fastens by means of a plurality of clips 75 engaging the inner periphery of the lugs 76. The wheel cover 77 has a radial wall 78 on the inboard side which abuts a mating radial wall 79 on the brake drum 61. The large area of contact of the wheel cover 77 with the brake drum 61 provides for rapid heat transfer from the brake drum to the wheel cover. The plurality of lug bolts 62 extend into a recessed portion 80 in the wheel cover 77. The same number of recesses 80 are provided to accommodate the lug bolts and nuts 62 and 63.

The wheel cover 77 is provided with a plurality of fins 81 on the outboard side of the wheel cover. These fins extend from the outer periphery of the wheel cover 77 to the central portion of the wheel cover and provide a large area for radiating of heat from the wheel cover 77. The wheel 58 provides a mounting means for the lugs 76 which are welded to the rim section 82 of the vehicle wheel.

FIGURE 4 illustrates the recess 80 of the wheel cover 77 for accommodating the bolts 62 and nut 63. The wheel cover 77 must be removed to remove the nut 63 from the bolt 62 in disassembling the rim 82 from the wheel 58.

The device for cooling the brake structure operates in the following described manner. The contact of the brake shoe 28 on the inner periphery of the sleeve 16 creates heat to the brake drum 14. As the brake drum 14 is heated the heat is transferred to the heat transfer arm 34 of the wheel cover 33. The contacting surface of the heat transfer arm 34 makes a firm seating on the recessed portion 37 on the brake drum. The spring 39 on the wheel cover 33 maintains a firm contact between these two portions of the brake drum 14 and the wheel cover 33. This provides a means for readily transferring the heat from the brake drum 14 to the wheel cover 33. The heat is conducted through the heat transfer arm 34 to the torus of the wheel cover. The torus of the wheel cover 33 contains the plurality of angularly spaced fins 49 which radiate heat to the air stream as the wheel and cover rotate.

It has been found that as a vehicle wheel rotates during forward motion of a motor vehicle that a decrease in air pressure is realized on the inside of the vehicle wheel. This in turn causes an air movement from the inboard side of the vehicle wheel to the outboard side of the vehicle wheel. The perforations 41 and 35 permit the movement of air through the vehicle wheel. This provides a movement of air through the wheel and transfer of heat from the fin 18 of the brake drum 14. As the air is moved to the outboard side of the wheel the heat is also carried along and passed to the outboard side of the wheel through the passage between the rim 32 and the wheel cover 33. The passage of the air current in this manner provides the cooling of the brake drum 14.

As the brake drum is heated, heat is also transferred from the fins 18 on the outer periphery of the brake drum 14. This heat transfer may be to the air passing along the inboard side of the vehicle wheel caused by the turbulence of the rotation of the wheel or transferred to the passage between the brake drum 14 and the rim 32. The combination of the cooling effects caused by these three methods of cooling all aid in the cooling of the braking structure.

The illustration on FIGURE 3 operates in much the same manner as that illustrated in FIGURES 1 and 2, however, there are no provisions for the passing air current through perforations in the vehicle wheel. The vehicle brake drum 61 when heated transfers the heat to the wheel cover 77. After the heat is transferred through the contact points 79 on the brake drum and the mating surface 78 on the wheel cover, the heat is then conducted through the fins 81. The fins 81 rotate in the air stream on the outboard side of the vehicle wheel as the automobile is in motion. This rotation of the fins in the air stream radiates heat to the passing air stream and thereby cools the braking structure.

The brake illustrated in FIGURE 3 provides for a sturdy construction of a vehicle wheel having means for welding the two segments of the wheel. These two segments of the wheel accommodate the bearings for rotatably mounting the wheel on the spindle 51. The brake drum 61 is also fastened to the vehicle wheel. In this manner, a lightweight metal may be used in the drum and a stronger and more economical metal may be used in the wheel. The rim section 82 of the vehicle wheel is fastened to the lug bolt 62 and nut 63 thereby providing a sturdy support for the rim section 82 of the vehicle wheel.

While the embodiments of the present invention as herein disclosed, constitute preferred forms, it is to be understood that other forms might be adopted.

What is claimed is as follows:

1. In a device of the character described comprising in combination, a wheel support member, a brake drum and a vehicle wheel rotatably supported on said wheel support member, said wheel including the rim section and a rim supporting wall having perforations to accommodate movement of air through said vehicle wheel, said brake drum having a drum section supported by a drum supporting wall, said drum supporting wall having heat transfer surfaces, said drum section mounted in radial spaced relation to said rim section of said vehicle wheel to provide passage means in communication with said perforations in said rim supporting wall of said vehicle wheel, a wheel cover mounted on said wheel including a torus having heat transfer legs extending through the perforations in said rim supporting wall of said vehicle wheel to contact said heat transfer surfaces on said brake drum, said torus including radiating fins on the outboard side of said wheel cover, said heat transfer legs thereby providing a means for conducting heat from said brake drum to said radiating fins, said torus mounted in spaced relation to the rim section of said wheel to provide continuous passage means on the radially inner side of said rim section of said wheel to permit passage of air for cooling of said brake drum and discharge of said air on the outboard side of said vehicle wheel into the passing air stream as said vehicle wheel is rotated, said torus forming a central opening for the reception of the hub cap to accommodate assembly and disassembly of said wheel and said vehicle wheel.

2. In a device of the character described comprising in combination, a wheel support member, a brake drum and a vehicle wheel rotatably supported on said wheel support member, said wheel including a rim section supported by a rim supporting wall, said brake drum including a drum section supported by a drum supporting wall, said drum supporting wall having a heat transfer surface on the outboard side of said wall, said rim supporting wall of said vehicle wheel having perforations, said drum section of said brake drum radially spaced from said rim section of said wheel to provide passage means in communication with said perforations, a wheel cover including a torus having a plurality of fins angularly spaced about the outboard side of said torus, said wheel cover having axially extending legs contacting the heat transfer surface on said brake drum by extending through the perforations in said vehicle wheel thereby providing a means to conduct heat from said brake drum to the radiating fins on said torus of said wheel cover for cooling of said brake drum, said torus of said wheel cover mounted in spaced relation to the rim section of said wheel thereby providing a continuous passage from the inboard side of said wheel on the radially inward side of the rim section of said wheel to the outboard side of said wheel to accommodate air flow and cooling of said brake drum when said vehicle wheel is in rotation.

3. In a device of the character described comprising in combination, a wheel support member, a brake drum and wheel rotatably supported on said wheel support member, said wheel including a rim section supported by a rim supporting wall, said rim supporting wall having perforations to permit passage of air through said vehicle wheel, said brake drum having a drum section supported by a drum supporting wall, said drum supporting wall having heat transfer surfaces formed on the outboard side of said drum supporting wall, said drum section of said brake drum mounted in spaced relation to said rim section of said wheel thereby providing passage means between said rim and said drum in communication with said perforations in said wheel, a wheel cover mounted on the outboard side of said vehicle wheel resiliently fastened to said rim supporting wall of said vehicle wheel, said wheel cover forming a torus having a plurality of radiating fins on the outboard side of said wheel cover, said torus of said wheel cover having heat transfer legs extending to and contacting the heat transfer surface of said brake drum to conduct heat from said brake drum to the outboard side of said wheel cover, said torus mounted in spaced relation to the rim section of said wheel thereby providing continuous passage means on the radially inner side of said rim section of said wheel to provide cooling of said brake drum by conduction through said heat transfer legs and air circulation through said passage means adjacent said rim section of said wheel when said vehicle wheel is in rotation.

References Cited in the file of this patent

UNITED STATES PATENTS

| 1,931,946 | Zerk | Oct. 24, 1933 |
| 2,143,950 | Kliesrath | Jan. 17, 1939 |
| 2,166,695 | Van Halteren | July 18, 1939 |
| 2,331,259 | Whitten | Oct. 5, 1943 |
| 2,428,469 | Plant et al. | Oct. 7, 1947 |
| 2,740,502 | Butterfield | Apr. 3, 1956 |
| 2,781,874 | Gaylord | Feb. 19, 1957 |

FOREIGN PATENTS

| 1,081,492 | France | June 9, 1954 |
| 768,743 | Great Britain | Feb. 20, 1957 |